United States Patent
Lykkegaard

(10) Patent No.: US 9,145,272 B2
(45) Date of Patent: Sep. 29, 2015

(54) CROSS-BELT SORTING SYSTEM

(75) Inventor: Uffe Lykkegaard, Aarhus C (DK)

(73) Assignee: Crisplant A/S, Aarhus N (DK)

( * ) Notice: Subject to any disclaimer, the term of this patent is extended or adjusted under 35 U.S.C. 154(b) by 0 days.

(21) Appl. No.: 14/237,661

(22) PCT Filed: Aug. 9, 2012

(86) PCT No.: PCT/DK2012/050290
§ 371 (c)(1),
(2), (4) Date: Feb. 7, 2014

(87) PCT Pub. No.: WO2013/023661
PCT Pub. Date: Feb. 21, 2013

(65) Prior Publication Data
US 2014/0158505 A1   Jun. 12, 2014

(30) Foreign Application Priority Data

Aug. 16, 2011 (DK) .................................. 2011 70448

(51) Int. Cl.
*B65G 17/32* (2006.01)
*B65G 47/53* (2006.01)
*B65G 17/34* (2006.01)
*B65G 47/76* (2006.01)
*B65G 47/96* (2006.01)

(52) U.S. Cl.
CPC .............. *B65G 47/53* (2013.01); *B65G 17/345* (2013.01); *B65G 47/766* (2013.01); *B65G 47/96* (2013.01)

(58) Field of Classification Search
CPC .. B65G 17/345; B65G 17/32; B65G 2207/18; B65G 47/52; B65G 15/50

USPC ...................................................... 198/370.06
See application file for complete search history.

(56) References Cited

U.S. PATENT DOCUMENTS

| | | | |
|---|---|---|---|
| 3,237,743 A | 3/1966 | Seaborn | |
| 4,815,582 A * | 3/1989 | Canziani | 198/370.06 |
| 5,547,084 A * | 8/1996 | Okada et al. | 198/370.06 |
| 6,209,703 B1 * | 4/2001 | Soldavini | 198/370.06 |
| 6,253,904 B1 * | 7/2001 | Soldavini | 198/431 |
| 6,585,101 B2 * | 7/2003 | Edwards et al. | 198/370.06 |
| 6,889,814 B2 * | 5/2005 | Cerutti et al. | 198/370.06 |
| 2003/0221935 A1 * | 12/2003 | Barklin et al. | 198/370.06 |

FOREIGN PATENT DOCUMENTS

| | | |
|---|---|---|
| CN | 101648185 | 2/2010 |
| DE | 199 29 529 A1 | 1/2001 |
| EP | 0 393 773 A1 | 10/1990 |
| EP | 0 423 452 A2 | 4/1991 |
| EP | 0 633 208 A1 | 1/1995 |
| EP | 0 774 429 A1 | 5/1997 |
| EP | 0 927 689 A1 | 7/1999 |
| EP | 0 963 929 A1 | 12/1999 |
| EP | 0930248 B1 | 7/2002 |
| EP | 2154091 B1 | 5/2013 |

(Continued)

*Primary Examiner* — James R Bidwell
(74) *Attorney, Agent, or Firm* — Knobbe Martens Olson & Bear LLP

(57) ABSTRACT

In order e.g. to provide a more efficient cross-belt sorting system there is among others disclosed a cross-belt sorting system 102 for side by side items 808 in which system items are loaded onto their side by side position on a cross-belt by one or more top-load loading stations 106, 108 in response to an identification of the items.

17 Claims, 9 Drawing Sheets

(56) References Cited

FOREIGN PATENT DOCUMENTS

| JP | 63-272703 | 11/1988 |
| JP | 02-158810 | 6/1990 |
| JP | 09-40160 | 2/1997 |
| WO | WO 94/08878 A1 | 4/1994 |
| WO | WO 00/32502 A1 | 6/2000 |

* cited by examiner

CROSS-BELT SORTING SYSTEM

CROSS REFERENCE TO RELATED APPLICATIONS

This application is a U.S. National Phase Application of PCT International Application Number PCT/DK2012/050290, filed on Aug. 9, 2012, designating the United States of America and published in the English language, which is an International Application of and claims the benefit of priority to Danish Patent Application No. PA 2011 70448, filed on Aug. 16, 2011. The disclosures of the above-referenced applications are hereby expressly incorporated by reference in their entireties.

FIELD OF THE INVENTION

The invention relates to a sorting system comprising a plurality of linked carriages moveable in a sorting track and equipped with sideways or crosswise driveable cross-belts.

BACKGROUND OF THE INVENTION

EP0927689 discloses a method for sorting of items by means of an equipment consisting of a plurality of conveyor platforms running along a route between an objects loading zone and an unloading zone, in which unloading zone the items are unloaded into collecting devices situated sideways with respect to the route of the conveyor platforms. Each of the conveyor platforms is fitted with means for unloading the conveyed items sideways with respect to the machine, i.e. a cross-belt sorting system. The method comprises that the items to be sorted are ordered in pairs so as to load them in the machine respecting the unloading order, two items are loaded on each conveyor platform so as to be positioned side by side on the conveyor platform. Unloading of the items is carried out according to the required order, when said conveyor platform runs near the collecting devices designed for the items.

It may be found that a disadvantage of the system and method described in EP0927689 may limit an efficiency of that sorting system. In particular, it may be found that the system for and manner of ordering the items may limit the efficiency of the system.

Thus, the applicant of the present invention has appreciated that an improved sorting system and method of sorting is of benefit, and has in consequence devised the present invention.

SUMMARY OF THE INVENTION

It may be seen as an object of the present invention to provide an improved sorting system and an improved method of sorting items on the sorting system. Preferably, the invention alleviates, mitigates or eliminates one or more of the above or other disadvantages singly or in any combination.

In particular, it may be seen as an object of the invention to provide a sorting system with an increased efficiency relative to a reference sorting system.

Accordingly there is provided, in a first aspect, a cross-belt sorting system for sorting items, the system comprising
  at least one loading station,
  a plurality of discharges,
  at least one item identification means, such as a barcode scanner, for providing an identification of the item,
  a plurality of conveying surfaces adapted for moving in a conveying direction in a sorter track and adapted for receiving one or more items from said loading station and for conveying said one or more items along the track to a discharge among said plurality of discharges and for discharging said one or more items from the track at the discharge in response to an identification of said one or more items,
  said conveying surfaces being cross-belts, and
  each of said cross-belts being adapted to convey two or more items in said conveying direction, and
  said sorting system being adapted for said two or more items to be positioned on a single cross-belt and to be positioned side by side in a direction transverse to the conveying direction, and
wherein
said at least one loading station is a top-load loading station for loading an item onto a predetermined cross-belt in a direction from a loading level which is higher than, in a vertical direction, such as at least 30, 50 or 100 mm higher than, an item supporting level of said predetermined cross-belt and towards said predetermined cross-belt, and
said top-load loading station comprises a diverter for diverting said item onto a first side or a second side of a conveying surface of said predetermined cross-belt in response to said identification of said item and
said top-load loading station is adapted to load said item onto said first or second side in response to said identification.

Thus, an improved sorting system is provided. An improvement or advantage of the sorting system can be found to lie therein that the described system comprises a top-load loading station as described.

Specifically, it follows that it may be seen as an advantage of the present invention that loading a diverted item with the top-load loading station in a direction as described and onto a side as described, provides a sorting system which is considered far more efficient than reference sorting systems, such as the system described in EP0927689.

One of the advantages of the system and method may be seen to be that more than two side by side items can easily be positioned in a flexible and efficient manner by the present invention. The first and second sides or parts are relative to an imaginary border between side-by-side sides, parts or areas of the conveying surface. The imaginary border is in the conveying direction or substantially in the conveying direction.

In order to provide an increased efficiency of the system, the two side by side items are preferably positioned so that a straight line transverse to the conveying direction and in the horizontal plane intercepts the two side by side items. It may be preferred that, e.g., a centre of each side by side item is positioned in the middle or substantially in the middle of a length of each conveying surface, where the length is measured in the moving direction. Alternatively, two side by side items may be positioned with their rearmost or their frontmost ends, when seen in the conveying direction as close to a rearmost and a frontmost end of a conveying surface, respectively.

Particularly, and possibly especially for two relatively small items, two such relatively small items may be so small that when they are, e.g., positioned on each of two sides of a single conveying surface, but one item towards the rearmost end of the conveying surface and the other item towards the frontmost end of the conveying surface, and although these items are positioned on each side of the imaginary border explained above, the straight line transverse to the conveying direction and in the horizontal plane do not intercept both items.

It is also to be understood that if more than two side by side items are to be loaded, received, positioned and conveyed on one single cross-belt, which the present system and method is highly appropriate for, first, second, third and even fourth sides or parts are hereby defined as first, second, third and fourth areas next to each other side by side. The number and size of a side, part or area is e.g. chosen in dependence of a distribution of item sizes.

In an embodiment of the invention the top-load loading station is considered as such when the top-load loading station is positioned in a distance above the conveying surfaces so that a lowermost level of the top-load loading station is positioned above, such as at least 30, 50 or 100 mm above, an item supporting level of item conveying surfaces of the cross-belts. A distance, in the vertical direction between the top-loading station and the conveying surfaces is typically chosen in dependence of a maximum height of the items handled in the sorting system. In particular, this is due to multiple top-load loading stations may be positioned after each other and/or in that, despite efforts to prevent this, recirculations of one or more items in a closed loop sorter track loop may appear.

In a further embodiment the top-load loading station is arranged and adapted so as to enable the item to be loaded with a velocity vector in the conveying direction. This, among others, enables the top-load configuration to load and thus position side by side items on the cross-belts very precisely at a position towards different sides of the conveying surface. This may e.g. follow in that the described velocity vector enables an item to be placed with close to a speed difference of zero when compared relatively to the speed of an item conveying surface. The speed of the item conveying surface is here understood as the speed which the carriages with the conveying surfaces moves in the conveying direction in the track, which may be referred to as a sorter speed.

When the top-load loading station is positioned so as for the track with the plurality of conveying surfaces to pass below, such as for the sorter track to cross below the top-load loading station or when the sorter track extends longitudinally in the same or substantially in the same longitudinal direction as at least one longitudinal section of the top-load loading station, a possible advantage is that e.g. the described velocity vector is effectively achievable. It may be preferred, but may not be seen as a necessity, that, e.g., at least an endmost conveyor of the top-load loading station, and/or at least a loading end of a top-load loading station, is situated such that a projection of at least the loading end, projects vertically downwards onto where items on conveying surfaces pass below. Thus, in particular where such position of the top-load loading station is present, it is seen to be preferred to adjust an open space under the top-load loading station in order for items already on the conveying surfaces to pass below the top-load loading station.

In one or more embodiments of the system, the diverter, such as a moveable plate, is adapted to divert the item relatively to a surface of a conveyor means supporting the item. Such types of embodiments are illustrated in FIGS. 5 and 6. In another embodiment of the system, the diverter, such as a rotational diverter, is adapted to divert the item relatively to a fixed point, such as centre of an axis of rotation of the rotational diverter. Such embodiment is illustrated in FIG. 7.

The embodiment of the rotational diverter in FIG. 7 may be particularly preferred for objects which e.g. due to their weight and/or outer surfaces are difficult to load towards one or the other side by diverting their position relative to the surface by which they are supported. For such items, a slight rotation of a supporting top-load conveyor means, such as a driven conveyor belt, will divert the item easily and thus enable the item to be loaded onto the first or the second side on the predetermined cross-belt. One type of diverter may even be followed by another in order to, in that way, to obtain a correct position of an item on the predetermined cross-belt.

Independent of the way of providing the divert function is foreseen that the diverter is positioned downstream of an item identification means, such as a barcode scanner, for identification of the item and the diverter is positioned prior to a position of the item on the system where the item is received on one of said conveying surfaces.

The top-load loading station may comprise a plurality of separate conveyors arranged in tandem, i.e. lined up consecutively one after another in the conveying direction, and preferably the diverter is positioned towards an end of the top-load loading station, such as comprised in, at, or as one or more of four last conveyors arranged in tandem of the top-load loading station.

When the sorting system comprises at least two top-load loading stations particularly efficient operation of the system may be provided.

In accordance with the method aspect of the invention there is provided a method of sorting items with a cross-belt sorting system comprising at least one loading station, a plurality of discharges, a plurality of conveying surfaces being cross-belts which are adapted for moving in a conveying direction in a sorter track and adapted for receiving an item from said loading station and for conveying said item in the track to a discharge among said plurality of discharges and for discharging said item from the track at the discharge in response to an identification of said item. The method comprises;

identifying said item to obtain said identification of said item, loading the item onto a predetermined cross-belt with said loading station, and receiving the item on the predetermined cross-belt from said loading station, and conveying the item in the conveying direction on said predetermined cross-belt to said discharge, wherein loading the item onto the predetermined cross-belt is carried out in a direction from a loading level which is higher than, in a vertical direction, such as at least 30, 50 or 100 mm higher than, an item supporting level of said predetermined cross-belt and towards said predetermined cross-belt, and loading the item onto a predetermined cross-belt includes loading and diverting the item with said top-load loading station onto a first side or a second side of a conveying surface of said predetermined cross-belt in response to said identification of said item, and receiving the item from said top-load loading station includes receiving the item on said first side or said second side of the conveying surface of said predetermined cross-belt.

Thus, an improved method of sorting items with a cross-belt sorting system is provided. Specifically, it can be found that loading and diverting the item in the described manner provides a more efficient method of operating a cross-belt sorting system than a reference method.

To increase the efficiency of the method, it has been found that for this particular system and method it is of benefit to load the item onto the first side or said second side of the supporting surface of the predetermined cross-belt in response to an identification of a plurality of successive items to be loaded onto the sorting system by a top-load loading station. Alternatively or additionally, loading said item onto said first side or said second side of said conveying surface of said predetermined cross-belt is furthermore provided in response to a current position of a diverter.

It is to be understood that the identification identifies if a preferred discharge, which preferred discharge has an entrance adjoining a side of the sorter track, for the item is positioned at the sorter track most adjacent to the first side or most adjacent to the second side of the conveying surfaces moving in the sorter track when said conveying surfaces are arriving at the preferred discharge.

Further, the system may comprise two loading stations, and at least one of these, such as the second of these may be a top-load loading station. Prior to a loading station, such as a top-load loading station, an item already positioned on the conveying surface may have its position slightly adjusted or even moved to the other side or to another part of the conveying surface. This enhances the flexibility or efficiency of the system and method even further when compared to a reference system and method. The adjusted position is transverse to the conveying direction towards a left or a right side of the track, i.e. in a discharge direction.

It is to be understood that here 'another part or side' of the conveying surface means that the item remains supported on the same area, part, side or position of the belt, but that the item is driven/moved by the belt towards another area, part, side or position relative to the sorting track. This is due to the item remaining supported by the belt, but that the belt moves.

In case e.g. three items are to be positioned side by side on one cross-belt and not only two, the word side can moreover be understood as the area in which in such case three imaginary or virtual areas of the conveying surface are set, one mid area and one area to each of a first and second side relatively to the mid area.

An advantage of the system and method may be seen to be that when the system is as described herein and operated as described herein, it is possible not to move the predetermined cross-belt in its driving direction, i.e. in a direction transverse or cross wise to the conveying direction of carriages running in the conveying direction, upon receiving an item on the belt. The transverse or cross wise direction can be referred to as a discharge direction. The discharge direction can be either left or right relative to the track and refers to the direction in which one or more items is/are to be discharged or unloaded upon the cross-belt, moving in the conveying direction in the track of the sorter, reaching one or more of the plurality of discharges.

This transverse or cross wise movement of the cross-belt is typically provided by an on-board driving means, such as an electric motor, operable for driving said predetermined cross-belt in the cross wise direction relative to the conveying direction.

Possibly or alternatively only a cross wise movement of e.g. only 0.5, 1, 2, 5, 10 or 15 centimeters can be provided upon receiving the item on the cross-belt. This may among others be seen to increase the efficiency of the system and method in that hereby e.g. more and/or larger items can be positioned on the same cross-belt e.g. without one or more of the items sliding off the cross-belt upon receiving further items.

By referring to an advantage herein, it must be understood that this advantage may be seen as a possible advantage provided by the invention, but it may also be understood that the invention is particularly, but not exclusively, advantageous for obtaining the described advantage.

In general the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
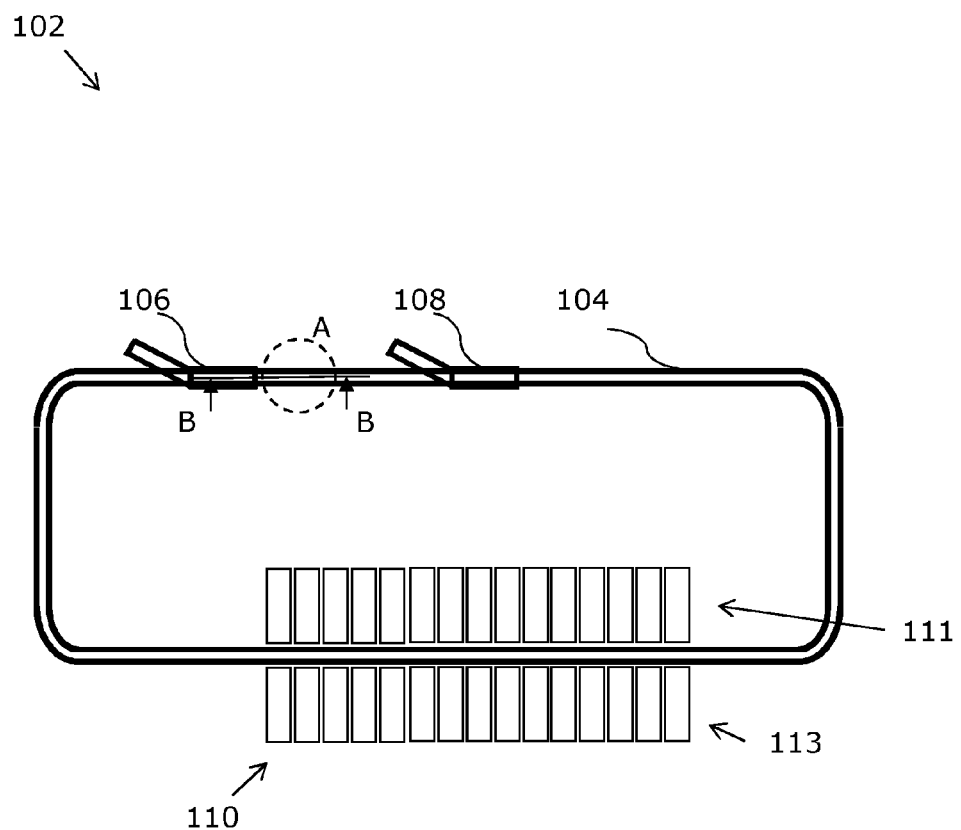
FIG. 1 illustrates a sorting system.

FIG. 1 illustrates a sorting system 102 comprising a plurality of linked carriages, where each of the carriages comprises a single conveying surface which is or comprises a cross-belt. In the example, the sorting system comprises a track 104 which forms an endless closed loop. The linked carriages are conveyed in the track by linear motors or similar.

The carriages travel in a conveying direction in a clockwise direction in the track. The figure illustrates two top-load loading stations 106 and 108 for loading items onto the conveying surfaces of the sorting system.

Further, the figure illustrates a plurality of discharges 110. The discharges pointed towards with the arrow 113 have entrances which are only reachable by, at least firstly, discharging an item which is positioned most adjacently towards a first side on an item conveying surface. The items may as an example be items of various sizes, shapes and consistencies, such as garments or textiles. The items or garments may be wrapped or packed, such as in plastic bags.

The discharges pointed towards with the arrow 111 have entrances which are only reachable by, at least firstly, discharging an item which is positioned most adjacently towards a second side. In the shown example the second side is most adjacently an inner side of the sorter loop of the two sides or parts of the cross-belt. A top view A and a cross sectional view B-B, both of the top-load loading station 106 are illustrated in the figure. These views are shown in FIGS. 2 and 3 respectively.

Figure 2:
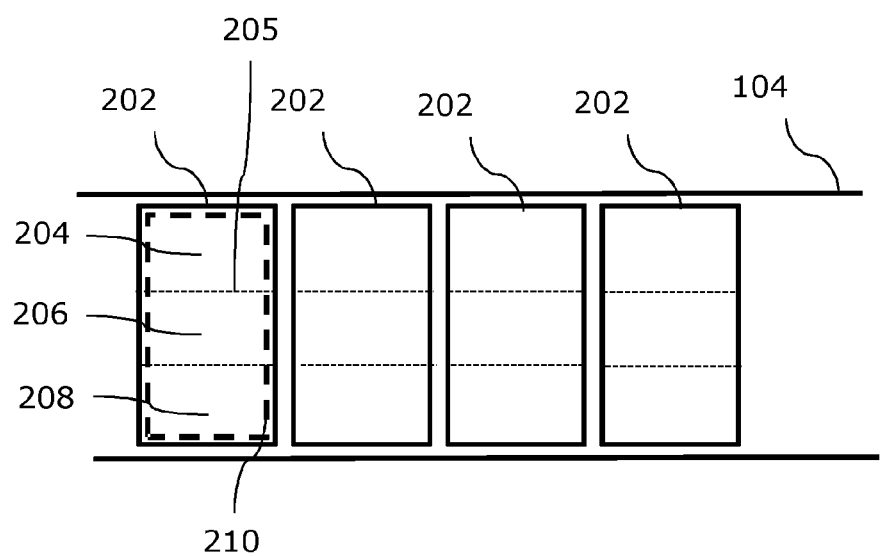
FIG. 2 illustrates top view A indicated on FIG. 1.

FIG. 2 illustrates top view A indicated on FIG. 1. The figure illustrates that the sorting system includes conveying surfaces 210 which are sectioned in three parts or sides 204, 206 and 208 respectively. The dashed line with the reference number 205 illustrates a virtual or imaginary border between the first and second sides or between first and second parts of the conveying surface 210. The conveying surface is illustrated as a single cross-belt 202.

Figure 3:
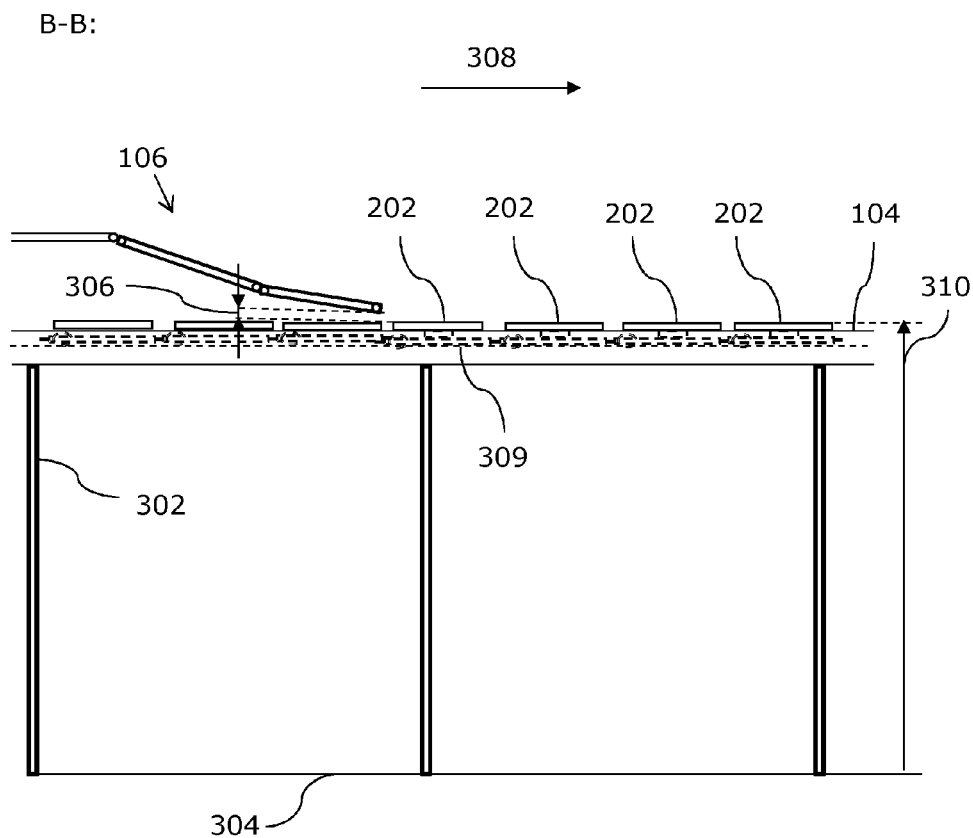
FIG. 3 illustrates cross section B-B along line B-B on FIG. 1.

FIG. 3 illustrates cross section B-B along line B-B on FIG. 1. In the example shown, one conveying surface 202 being a cross-belt is provided for each of the illustrated carriages 309. But alternatively and as an example, two or more cross-belts placed in tandem in the conveying direction 308, thus after each other, on each carriage may be used or preferred. The conveying direction 308 is the direction in which the conveying surfaces moves in the track 104 of the sorter of the sorting system. The track 104 comprises a sorter chassis supported by supports 302 above a floor 304.

The figure illustrates the top-load loading station 106 which is adapted to load an item onto a predetermined cross-belt in a direction from a loading level which is higher than, in a vertical direction, such as at least 30, 50 or 100 mm higher than, an item supporting level 310 of the predetermined cross-belt and towards the predetermined cross-belt in response to an identification of the item. This is illustrated with the distance 306 between the conveying surfaces 210 and a lowermost level of a loading end of the top-load loading station.

Figure 4:
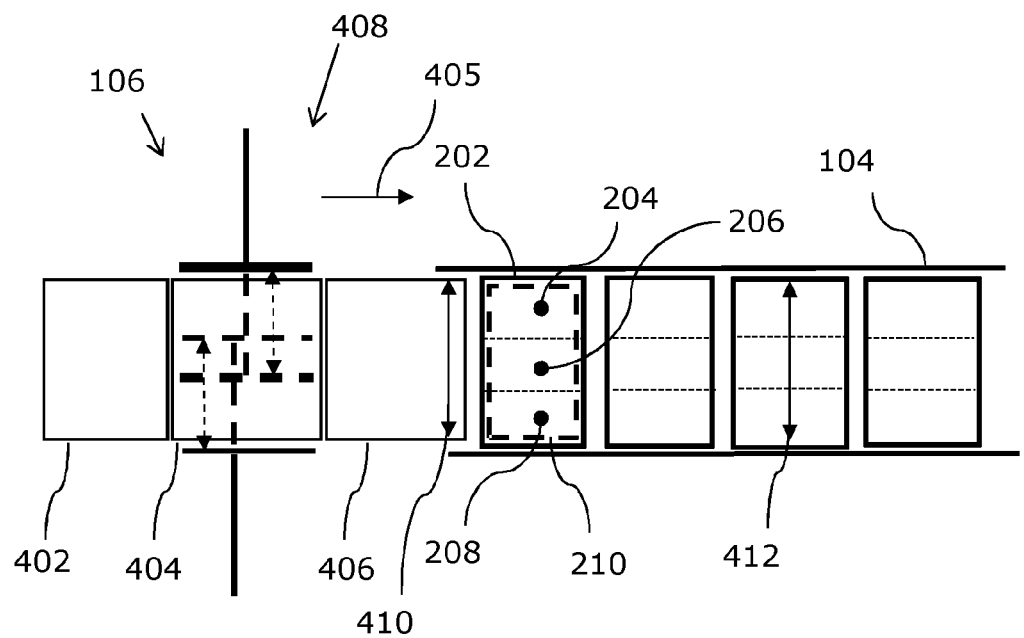
FIG. 4 is a top view of the top-load loading station with a diverter.

FIG. 4 is a top view of the top-load loading station 106 with a diverter 408. The illustrated top-load loading station comprises three separate conveyors 402, 404, 406 arranged in tandem. The diverter 408 is adapted to divert the item so as for the item to be loaded by the top-load loading station onto the first side 204 or the second side 206 of the cross-belt 202 in response to the identification of the item.

The conveying surface may comprise a further side, part or area and such further side, part or area is provided with the reference number 208.

The diverter 408 is positioned towards a loading end of the top-load loading station 106 and specifically shown positioned at the second last conveyor 404 of the conveyors 402, 404, 406 arranged and shown in tandem. The arrow with the reference number 405 pointing to the right side illustrates the direction 405 of items moved by the top-load loading station and towards the conveying surfaces of the sorter. The conveyor 406 at the loading end can be referred to as an end-most conveyor of the top-load loading station. In the shown embodiment of the top-load loading station, the top-load loading station extends in the same or substantially in the same longitudinal direction as the sorter track. In particular it is illustrated that at least the end-most conveyor 406 extends in the same direction as the sorter track 104. More particular, and as it follows from the figure, in the present embodiment, the three last conveyors 402, 404, 406 are provided for movement of the items towards the loading end in the direction 405, which direction 405, at least when seen in a top view, is the same direction as the conveying direction 308 of the conveying surfaces 210.

Though, possibly less preferred, one or more or all of the conveyor(s), particular the last ones, of the top-load loading station may be provided in an acute angle relatively to the sorter track, but this may or may not, and as an example, require additional equipment for achieving a given orientation of an item on a conveying surface. It may be preferred to be able to load an item onto a predetermined conveying surface, and in particular onto a predetermined side or part of such conveying surface, with a minimum of change of position and/or orientation of the item prior to and/or during and/or after the process of loading and until the item is to be discharged towards a given side of the sorter track 104. It may be seen as a possible advantage of the system and method described herein that such minimum of change is enabled.

It follows from FIG. 4 that a conveyor width 410 of at least the end most conveyor 406 of the top-load loading station is equal to a or substantially equal to, such as slightly narrower or wider than, a conveying surface width 412 of the below sorter.

Figure 5:
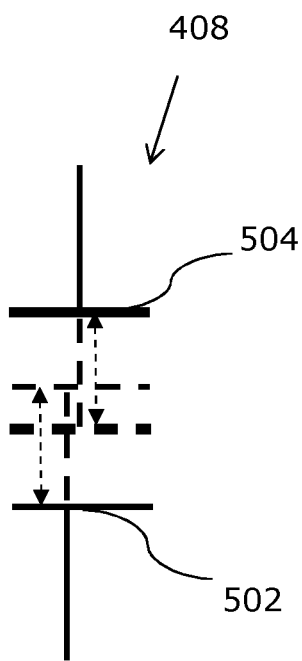
FIG. 5 is the diverter of FIG. 4 shown without the loading station and the sorting system.

FIG. 5 is the diverter 408 of FIG. 4 shown without the loading station and the sorting system. The diverter is illustrated as two moveable plates 502, 504, capable of diverting an item by pushing the item sideways as illustrated with the dashed arrows. This is provided by moving the plates to their dashed positions and thus for an item to be moved relatively to a surface of a conveyor means supporting the item. The item is then moved sideways on the conveyor means. The conveyor means could be a conveyor belt, such as the belt 404, or a roller conveyor for conveying and supporting the item towards the loading end of the top-load loading station.

Figure 6:
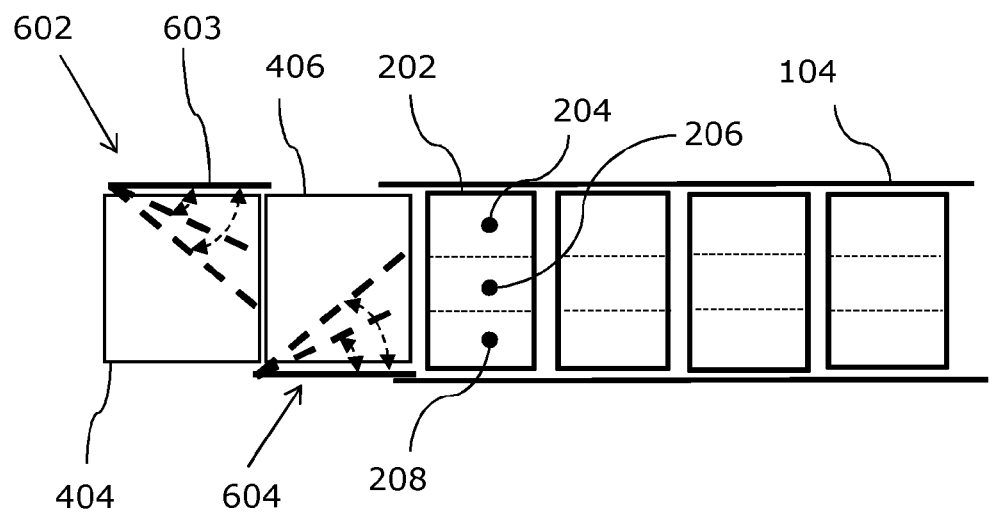
FIG. 6 illustrates another embodiment of a diverter seen from a top view.

FIG. 6 is a top view which illustrates another embodiment of a diverter comprising moveable plates 603, 604. The plates can be rotated as illustrated by the dashed arrows to the dashed position and thus in order for an item to be moved relatively to a surface of the conveyor means 404 and 406. As for the diverters illustrated in FIGS. 4 and 5 the diverter in FIG. 6 is provided for diverting an item so as for the diverted item to be loaded by the top-load loading station onto the first side 204 or the second side 206 of the cross-belt 202.

Figure 7:
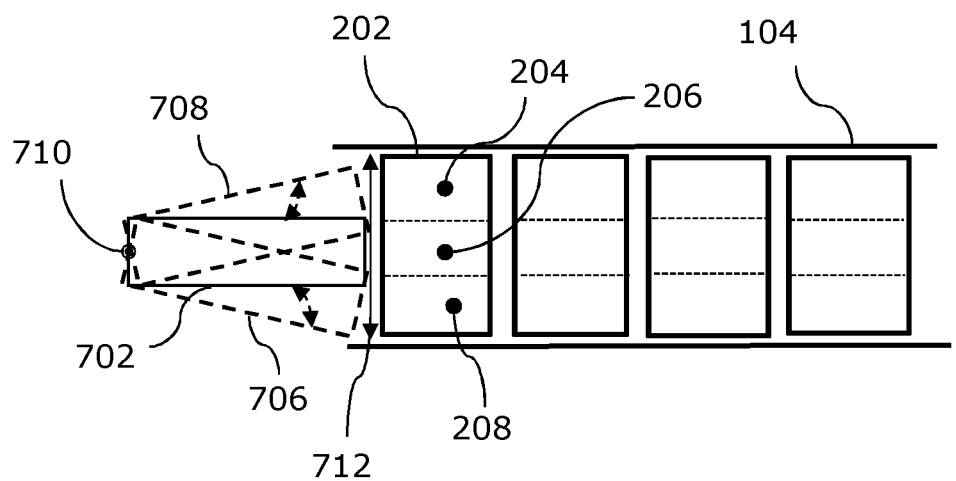
FIG. 7 illustrates a further embodiment of a diverter seen from a top view.

FIG. 7 illustrates a further embodiment of a diverter seen from a top view. The diverter 702 is a rotational diverter which is adapted to divert the item relatively to a fixed point, such as centre of an axis of rotation 710 of the rotational diverter 702. The diversion is provided by the conveyor means being able to rotate between a midposition shown with undashed lines and left and right positions, 708 and 706, respectively, shown with dashed lines. Hereby the item can be diverted to any of the positions, parts or sides 204, 206 or 208 on the conveying surface. Thus, it follows from the figure that a diversion range 712 of the rotational converter is configured to enable loading an item onto a predetermined part across the width of the conveying surface 210, which in the present embodiment is illustrated as a crossbelt 202.

Other types of diverters can be also be used. An alternative type may comprise a diverter positioned in a middle of a conveyor means of the top-load loading station and diverting items towards either a right or a left side.

For all of the embodiments of a top-load loading station with a diverter adapted to divert the item, so as for the item to be loaded by the top-load loading station onto the first side 204 or the second side 206 of the cross-belt 202, the diverter 408, 602, 702 is positioned downstream of, i.e. after, an item identification means, such as a barcode scanner for identification of the item and positioned prior to a position of the item on the system where the item is received on one of the conveying surfaces.

Further, it also follows that all of the embodiments of a top-load loading station with a diverter adapted to divert the item, so as for the item to be loaded by the top-load loading station onto, e.g., the first side 204 or the second side 206 of the cross-belt 202, the diverter 408, 602, 702 is provided with a conveying surface width 410, see FIG. 4, and/or a diversion range 712 for changing the position of the item in order to load the item on the predetermined part of the conveying surface.

Figure 8:
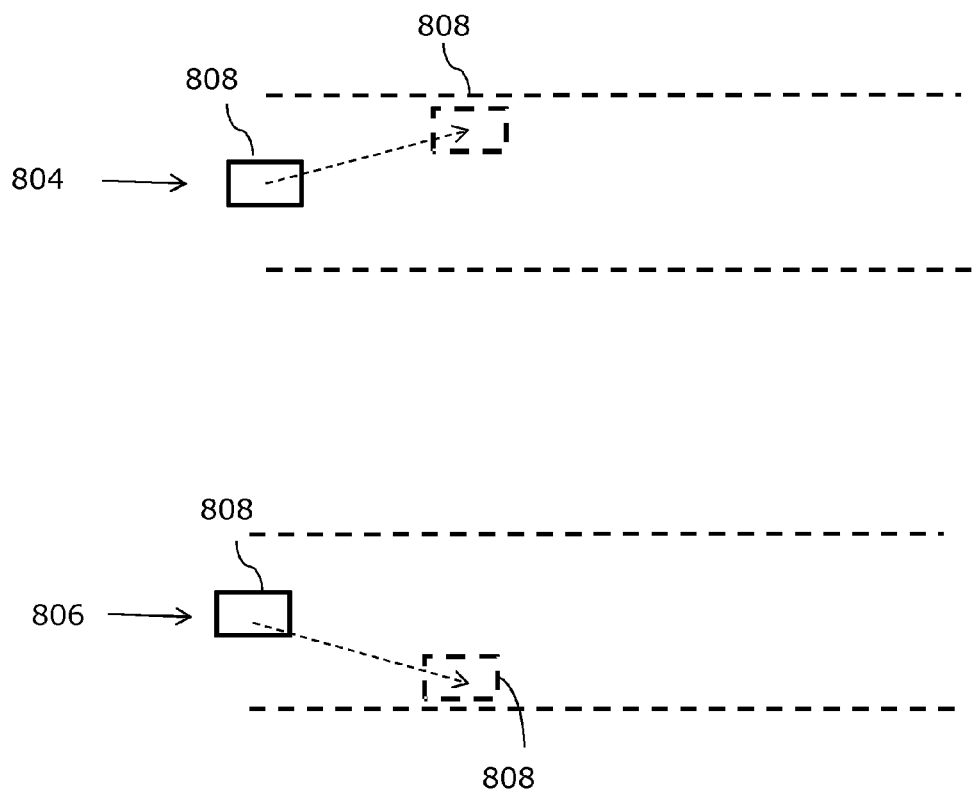
FIG. 8 is an illustration of an item which is diverted towards a first side or a second side and FIG. 9 is an illustration of an embodiment of the method in accordance with the invention and illustrates among others items which have been loaded onto a conveying surface and are positioned on the conveying surface in a side by side orientation.

FIG. 8 is an illustration of an item 808 which is diverted towards a first side as illustrated at the reference number 804 and an illustration of an item which is diverted towards a second side as illustrated at the reference number 806. Thus, the system includes position changing means, such as the diverter, for changing the position of the item in order to load the item on the predetermined part or side of the conveying surface of the sorter. In particular, and e.g. due to the top-load loading station, it may be seen that the system disclosed herein is able to load the item directly onto the correct side or part of the conveying surface.

It follows that the system disclosed herein also includes determination means, such as a computerized controller, for determining which part or side of the conveying surface a particular item should most efficiently be positioned on. Such determination can be provided in response to which side of the sorting track a given discharge for the particular item is placed, which information is statically or dynamically present in an overall sorting system control system as generally known from reference systems, and/or, e.g., in response to which of 2 side by side items is to be discharged firstly along the conveying direction of the track, and/or to which side this is to occur and/or, e.g., which side or part of a particular conveying surface is possibly already occupied. Thus, the system disclosed herein may also be equipped with occupation determination means, such as a camera and/or means for remembering, e.g., if any items are already placed on a given conveying surface to be loaded and/or which size, or other characteristics such as weight, of one or more items are already placed on which parts or sides of one or more conveying surfaces.

Figure 9:
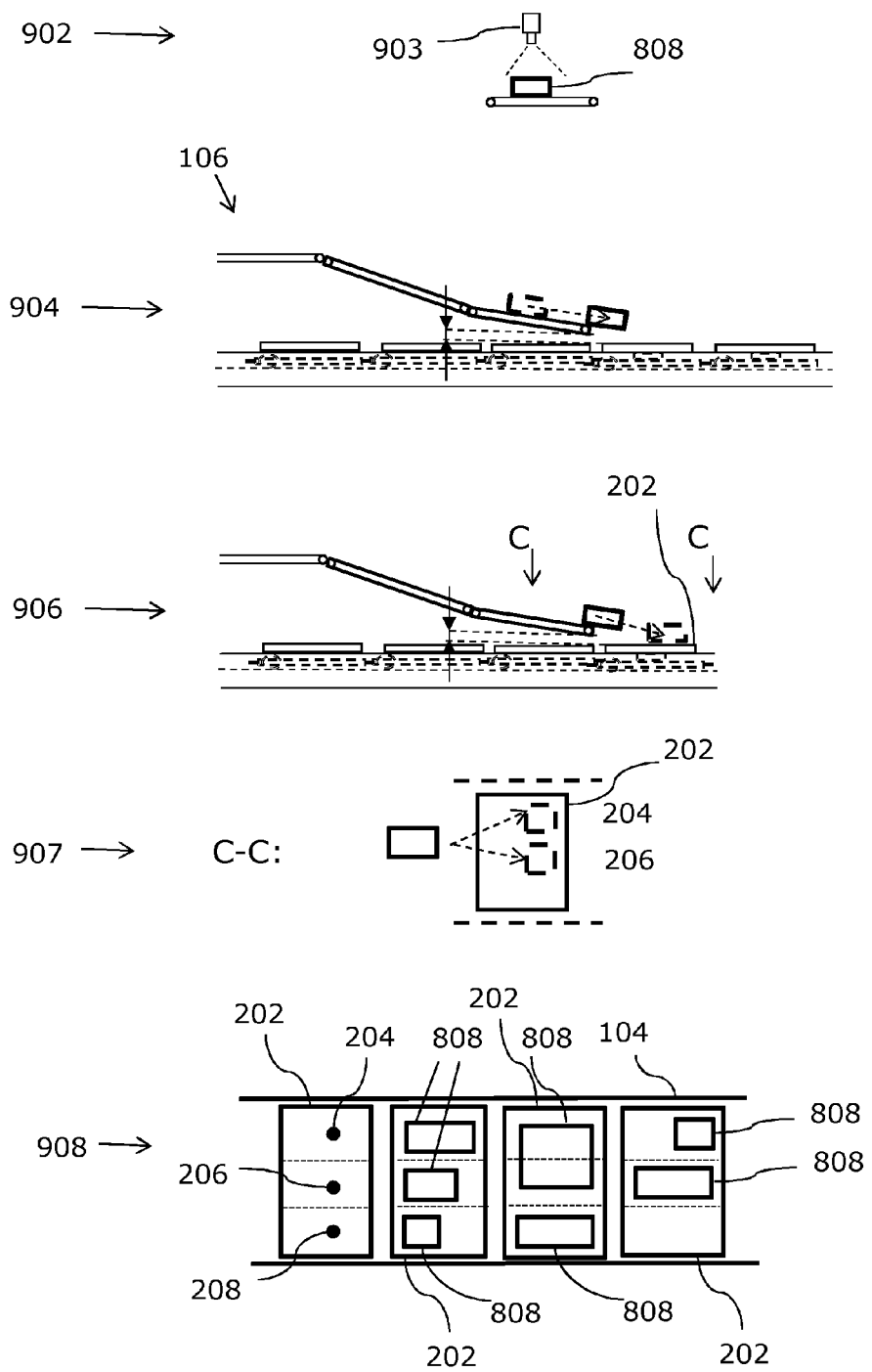

FIG. 9 illustrates a method of sorting items with a cross-belt sorting system comprising at least one loading station 106, a plurality of cross-belts which are adapted for moving in a conveying direction in a sorter track and adapted for receiving an item 808 from the loading station.

The method comprises identifying the item, with an item identification means, such as a barcode scanner 903, for providing an identification of the item, as illustrated at the reference number 902, to obtain an identification of the item, loading the item, as illustrated at the reference number 904, onto a predetermined cross-belt 202, which loading is carried out in a direction from a loading level which is higher than an item supporting level of the predetermined cross-belt and towards the predetermined cross-belt. Receiving the item on the cross-belt is illustrated at the reference number 906.

Further it is illustrated at the reference number 907 that the item is loaded onto the predetermined cross-belt and diverted by the top-load loading station onto a first side 204 or a second side 206 of a conveying surface of said predetermined cross-belt in response to said identification of said item.

Furthermore at the reference number 908 four cross-belts are shown in top view with respectively 0, 3, 2 and 2, side by side items on each cross-belt 202. The items have been loaded onto the conveying surfaces to be positioned in their side by side positions as illustrated with the top-load loading station 106. This has been provided while the conveying surfaces are moving in the track at their travelling speed in the track of e.g. 0.5 meter per second, 1 m/s, 1.5 m/s, 2 m/s or even at 3 m/s.

In short it is herein disclosed that in order e.g. to provide a more efficient cross-belt sorting system there is disclosed a cross-belt sorting system 102 for side by side items 808 in which system items are loaded onto their side by side position by one or more top-load loading stations 106, 108 in response to an identification of the items.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. A cross-belt sorting system for sorting items, the system comprising:
    at least one loading station,
    a plurality of discharges,
    at least one item identification means, for providing an identification of the item,
    a plurality of conveying surfaces adapted for moving in a conveying direction in a sorter track and adapted for receiving one or more items from said loading station and for conveying said one or more items along the track to a discharge among said plurality of discharges and for discharging said one or more items from the track at the discharge in response to the identification of said one or more items,
    said conveying surfaces being cross-belts, and
    each of said cross-belts being adapted to convey two or more items in said conveying direction, and
    said sorting system being adapted for said two or more items to be positioned on a single cross-belt and to be positioned side by side in a direction transverse to the conveying direction, and
    wherein
    said at least one loading station is a top-load loading station for loading an item onto a predetermined cross-belt in a direction from a loading level which is higher than, in a vertical direction, an item supporting level of said predetermined cross-belt and towards said predetermined cross-belt, and
    said top-load loading station comprises a diverter for diverting said item onto a first side or a second side of a conveying surface of said predetermined cross-belt in response to said identification of said item and
    the top-load loading station is adapted to load said item onto said first or second side in response to said identification.

2. The cross-belt sorting system according to claim 1, wherein the top-load loading station is positioned a distance above the conveying surfaces so that a lowermost level of a loading end of the top-load loading station is positioned above an item supporting level of an item conveying surface of said cross-belts.

3. The cross-belt sorting system according to claim 1, wherein the top-load loading station is arranged and adapted so as to enable the item to be loaded with a velocity vector in the conveying direction.

4. The cross-belt sorting system according to claim 1, wherein the top-load loading station is positioned such that the track with the plurality of conveying surfaces passes below the top-load loading station.

5. The cross-belt sorting system according to claim 1, wherein the top-load loading station is positioned such that the track with the plurality of conveying surfaces extends longitudinally in the same or substantially in the same longitudinal direction as at least one longitudinal section of the top-load loading station.

6. The cross-belt sorting system according to claim 1, wherein the diverter is adapted to divert the item relatively to a surface of a conveyor that supports the item.

7. The cross-belt sorting system according to claim 1, wherein the diverter, is adapted to divert the item relatively to a fixed point.

8. The cross-belt sorting system according to claim 1, wherein the diverter is positioned downstream of the item identification means for identification of the item and the diverter is positioned prior to a position of the item on the system where the item is received on one of said conveying surfaces.

9. The cross-belt sorting system according to claim 1, wherein the top-load loading station comprises a plurality of separate conveyors arranged in tandem.

10. The cross-belt sorting system according to claim 1, wherein the diverter is positioned towards an end of the top-load loading station.

11. The cross-belt sorting system according to claim 1, wherein said cross-belt sorting system comprises a loading station one and a loading station two, wherein the loading station two is a top-load loading station, the top-load loading station being positioned at a position along the sorter track so as to load items onto the conveying surfaces at a position after the loading station one, relatively to the conveying direction.

12. A method of sorting items with a cross-belt sorting system comprising at least one loading station, a plurality of discharges, a plurality of conveying surfaces being cross-belts which are adapted for moving in a conveying direction in a sorter track and adapted for receiving an item from said loading station and for conveying said item in the track to a discharge among said plurality of discharges and for discharging said item from the track at the discharge in response to an identification of said item, said method comprising:

identifying said item to obtain said identification of said item, loading the item onto a predetermined cross-belt with said loading station, receiving the item on the predetermined cross-belt from said loading station, and conveying the item in the conveying direction on said predetermined cross-belt to said discharge, wherein:

loading the item onto the predetermined cross-belt is carried out in a direction from a loading level which is higher than, in a vertical direction, an item supporting level of said predetermined cross-belt and towards said predetermined cross-belt, and loading the item onto a predetermined cross-belt includes loading and diverting the item with said top-load loading station onto a first side or a second side of a conveying surface of said predetermined cross-belt in response to said identification of said item, and receiving the item from said top-load loading station includes receiving the item on said first side or said second side of the conveying surface of said predetermined cross-belt.

13. The method according to claim 12, wherein loading said item onto said first side or said second side of said supporting surface of said predetermined cross-belt is furthermore provided in response to an identification of a plurality of successive items to be loaded onto the sorting system by the top-load loading station.

14. The method according to claim 12, wherein loading said item onto said first side or said second side of said conveying surface of said predetermined cross-belt is furthermore provided in response to a current position of a diverter.

15. The method according to claim 12, wherein said identification identifies if a preferred discharge for the item is positioned at the sorter track most adjacent to the first side or most adjacent to the second side of the conveying surfaces moving in the sorter track when said conveying surface is arriving at the preferred discharge.

16. The method according to claim 12, wherein said system comprises a loading station one and a loading station two, wherein loading station two is a top-load loading station, the top-load loading station being positioned at a position along the sorter track so as to load items onto the conveying surfaces at a position after the loading station one, relatively to the conveying direction and wherein said method further comprises moving the conveying surface of a cross-belt in a discharge direction transverse to the conveying direction prior to said conveying surface arriving at the loading station two, so as to move an item loaded onto the first or the second side of the cross-belt by the loading station one in the discharge direction prior to said supporting surface arriving at the loading station two.

17. The method according to claim 12, wherein receiving the item on said first side or said second side comprises that, upon receiving the item, the predetermined cross-belt remains unmoved or substantially unmoved in a direction transverse to the conveying direction.

* * * * *